(12) United States Patent
Mitchell

(10) Patent No.: US 8,448,678 B2
(45) Date of Patent: *May 28, 2013

(54) WATER COLLECTION APPARATUS AND METHOD

(71) Applicant: Robert Kenneth Edwin Mitchell, Toronto (CA)

(72) Inventor: Robert Kenneth Edwin Mitchell, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/647,519

(22) Filed: Oct. 9, 2012

(65) Prior Publication Data
US 2013/0036663 A1 Feb. 14, 2013

Related U.S. Application Data

(63) Continuation of application No. 12/635,764, filed on Dec. 11, 2009, now Pat. No. 8,347,927.

(51) Int. Cl.
B65B 39/00 (2006.01)

(52) U.S. Cl.
USPC ............ 141/337; 141/1; 47/21.1; 47/32; 47/32.4; 47/48.5

(58) Field of Classification Search
USPC ............ 55/423; 47/21.2, 31, 32, 32.4, 48.5, 47/21, 48.51; 141/1, 331, 337, 338
See application file for complete search history.

(56) References Cited

U.S. PATENT DOCUMENTS

| | | | | |
|---|---|---|---|---|
| 4,043,077 A * | 8/1977 | Stonehocker | ............ | 47/66.1 |
| 4,308,688 A * | 1/1982 | Revane | ............ | 47/32.7 |
| 4,751,751 A * | 6/1988 | Reno | ............ | 4/144.4 |
| 6,195,935 B1 * | 3/2001 | Bellucci et al. | ............ | 47/9 |
| 6,976,334 B1 * | 12/2005 | Bowditch | ............ | 47/32 |
| 7,402,195 B2 * | 7/2008 | Lawrence et al. | ............ | 95/117 |
| 2002/0074247 A1 * | 6/2002 | Tremblay | ............ | 206/223 |
| 2008/0190017 A1 * | 8/2008 | Hoff | ............ | 47/21.1 |
| 2008/0268229 A1 * | 10/2008 | Lee et al. | ............ | 428/323 |
| 2011/0126711 A1 * | 6/2011 | Hoff | ............ | 95/291 |

FOREIGN PATENT DOCUMENTS

| | | |
|---|---|---|
| EP | 1952394 | 8/2008 |
| WO | WO2008069848 A2 | 6/2008 |

OTHER PUBLICATIONS

Cohen, R., et al.; QinetiQ; Dew Collector; Online at: http://www.rexresearch.com/qinetiq/qinetiq.htm (acessed Dec. 1, 2009).

* cited by examiner

*Primary Examiner* — Jason K Niesz
(74) *Attorney, Agent, or Firm* — Christopher D. Heer; Bennett Jones LLP

(57) ABSTRACT

An apparatus and method for passively collecting water in an environment where dew forms are disclosed. The apparatus has a radial body which includes a hydrophobic surface that is supported at a slope of about 10 to 80 degrees from the direction of gravity. The apparatus may also include ridges which increase the surface area of the body thus increasing dew collection and provide shade which reduces the temperature increase of the body when the apparatus is exposed to sunlight. The method includes supporting a hydrophobic radial surface at a slope of about 10 to 80 degrees from the direction of gravity and waiting for dew or condensation to form on the hydrophobic surface and run down the hydrophobic surface to either a reservoir or a beneficiary of the passively collected water, such as the roots of a plant.

11 Claims, 2 Drawing Sheets

WATER COLLECTION APPARATUS AND METHOD

CROSS-REFERENCE TO RELATED APPLICATION

This application is a continuation of U.S. patent application Ser. No. 12/635,764, filed Dec. 11, 2009. The patent application identified above is incorporated herein by reference in its entirety to provide continuity of disclosure.

FIELD OF THE INVENTION

The present invention relates to water collection, and more particularly, to a water collection apparatus and method for collecting dew and condensation, in addition to rain water.

BACKGROUND OF THE INVENTION

Water is essential to human, animal and plant life. Humans require, on average, 2 to 5 liters of water a day to sustain life. Water is also needed for agriculture, to provide food for humans and animals.

Despite the great need for water, just 3% of the global water supply is fresh water that can be used by humans for consumption and for agriculture. Further, about 69% of the world's fresh water is locked in glaciers and ice caps and almost all of the rest is ground water. Lakes and rivers, rainwater, dew, fog, condensation and evaporation are additional sources of fresh water. Only about 0.3% of fresh water is contained in lakes and rivers, which supplies most of the water humans use.

Transporting fresh water from lakes and rivers to where water is needed typically involves the installation of piping and the use of pumps, or other water distribution methods, all of which require energy and incur costs.

In desert regions, fresh water is scarce. The average amount of precipitation is less than 25 centimeters a year and evaporation exceeds precipitation. At present, approximately one-sixth of the land on earth is desert and desertification of marginal rangeland or cropland through extended drought, overgrazing or climate change continues at a rate of several hundred thousand square kilometers to millions of square kilometers per year. Yet about half of the deserts of the world get enough rainfall to sustain at least light livestock grazing or agriculture which if managed suitably could significantly increase the world's food supply.

It would be desirable to collect water more proximate to where water is needed so as to reduce energy consumption and costs associated with transporting water and it would also be desirable to increase the water supply in areas where fresh water is scarce. Accordingly, there remains a need for improvements in the art.

BRIEF SUMMARY OF THE INVENTION

According to one aspect, the present invention provides an apparatus for passively collecting water in an environment where dew forms comprising: a radial body comprising a first portion at a slope of about 10 to 80 degrees from the direction of gravity and comprising a plurality of ridges; and a second portion for supporting the first portion surface at the slope.

According to another aspect, the present invention provides an apparatus for passively collecting water in an environment where dew forms comprising: a body comprising a hydrophobic surface at a slope of about 10 to 80 degrees from the direction of gravity; and a portion for supporting the hydrophobic surface at the slope.

According to another aspect, the present invention provides a method for passively collecting water in an environment where dew forms comprising: supporting a hydrophobic radial surface at a slope of about 10 to 80 degrees from the direction of gravity; and waiting for dew or condensation to form on the hydrophobic surface and run down the hydrophobic surface to a beneficiary or reservoir for the passively collected water.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example, embodiments of the invention, and how they may be carried into effect, and in which.

Like reference numerals indicate like or corresponding elements in the drawings.

DETAILED DESCRIPTION OF THE EMBODIMENTS

Embodiments of the present invention are generally directed to an apparatus and method for water collection.

According to embodiments of the invention, the apparatus passively collects water, which may be directed to a beneficiary or reservoir and used for any purpose which uses water. It may be used for agricultural irrigation, including in warm semi-arid environments. It may also be used for the irrigation and reintroduction of plant species to areas of desertification. As such, passive irrigation may improve the viability of the deserts of the world.

Deserts are a good environment for dew formation as deserts typically have hot days and cool nights. For example, summer temperatures in a semi-arid desert may be between 21 to 27 degrees Celsius in the day, cooling to about 10 degrees Celsius at night. As dew is condensation of moisture in the air that collects on an object when its surface becomes cooler than the moisture in the air, dew tends to form at the lowest temperatures of the day, which are often just prior sunrise. Dew is also qualitatively equivalent to precipitation in terms of environmental impact and may equal or exceed the rainfall received by some deserts.

Figure 1:
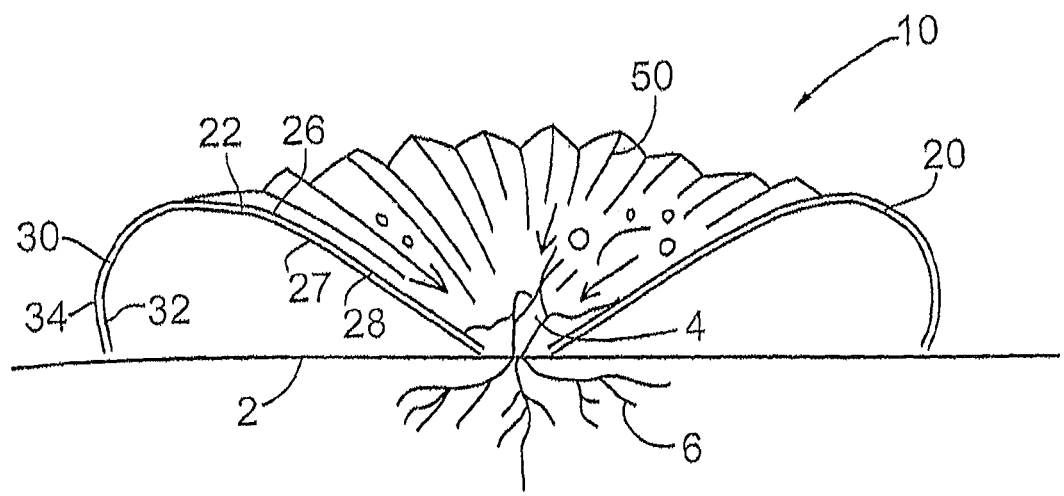
FIG. 1 is a side sectional view of an apparatus for passively collecting water according to an embodiment of the present invention.
Figure 2:
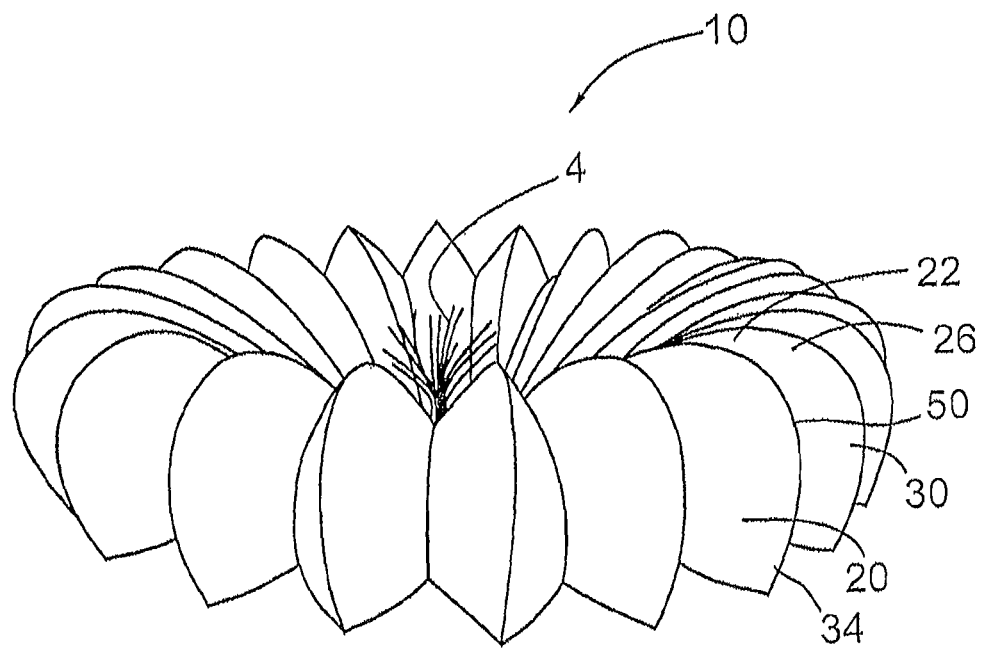
FIG. 2 is a perspective view of the apparatus of FIG. 1.

According to an embodiment of the apparatus as shown in FIG. 1 and FIG. 2, the water collection apparatus 10 has a body 20 which has a first portion 22 and a second portion 30. The first portion 22 may comprise a hydrophobic surface 26. The first portion 22 may comprise a hydrophobic material such as a plastic or polymer resin providing the hydrophobic surface 26, or the first portion 22 may comprise a substrate 28, such as a moulded or cast polymer resin, plastic, or thin metal, and a coating or skin which may comprise one or more of Teflon™, an OPUR™ thin foil coating product, a hydrophobic paint such as Lotus™ paints, a polymer resin containing a microsphere, or other suitable alternatives known in the art. The hydrophobic surface 26 may also comprise a microtopographic or laser micro-processed surface to reduce the adhesive force on the water droplets by trapping air under them; thus reducing their surface contact. According to an embodiment, the first portion 22 may comprise a second hydrophobic surface 27 on the underside of the body 20. According to a further embodiment, the entire surface of the body 20 may be hydrophobic.

Hydrophobic surfaces do not allow for the adhesion of the water droplet. This is desirable as a water molecule transfers heat energy to a surface when it adheres to the surface. Hydrophobic surfaces may also reduce water contact with the surface by over 95% when a microscopic textured surface is used. This may be desirable as it reduces the heat generated by friction from the water moving across the hydrophobic surfaces 26 and 27. Thus, the hydrophobic surfaces 26 and 27 may increase the efficiency of water collection by reducing the absorption of water into the body 20 and reducing the water lost to evaporation arising from the heat generated by friction from the water moving across the hydrophobic surfaces 26 and 27. The hydrophobic surfaces 26 and 27 may also increase the flow of water into the reservoir, which may be any type of reservoir or water receptacle or water storage system, or the beneficiary of the passively collected water such as a plant 4 or the roots 6 of the plant 4.

Since dew forms on cool surfaces, reducing heat build-up may also increase dew collection as more dew will form on the hydrophobic surface 26, the cooler the surface temperature of the body 20 is kept. Once the surface temperature of the body 20 rises, dew may not form as moisture increasingly evaporates. However, rising air temperature may cause moisture to evaporate from the ground beneath the body 20 and then condense on hydrophobic surface 27. As a result, dew and condensation typically occur at different times during the day—dew in the early morning and condensation during the mid-afternoon as the air temperature increases. This allows for a cyclical process for the collection of water.

According to an embodiment, the body 20 may be white or suitably light-coloured so as to reduce the absorption of heat from sunlight, which may increase dew collection. According to a further embodiment where the apparatus collects water and directs it toward a plant 4, the body 20 may be sage or suitably neutral-coloured such that only a moderate amount of sunlight is reflected off of the body 20 towards the plant 4. While this may increase the temperature of the body 20 during the day as more sunlight may be absorbed by a neutral-coloured body 20 than a light-coloured body 20, the neutral-coloured body 20 may reduce moisture loss by the plant 4 through transpiration due to the reduced amount of sunlight reflected off of the body 20 into the plant 4.

According to an embodiment, the first portion 22 may be sloped at an angle of about 10 to 80 degrees relative to the direction of gravity. According to a further embodiment, the first portion 22 may be sloped at an angle of about 50 to 70 degrees relative to the direction of gravity. According to a yet further embodiment, the slope of the first portion 22 may be about 60 degrees relative to the direction of gravity, which is a slope which may be preferred for dew collection. Gravity is used for transportation of the dew, condensation or rain water across the hydrophobic surfaces 26 and 27 to the reservoir or beneficiary such as the roots 6 of the plant 4. Dew or rain water may also run down the outer side 34 of the second portion 30 and condensation may run down the inner side 32 of the second portion 30, both of which may irrigate the roots 6 of the plant 4 which may assist the roots 6 to grow out further.

According to an embodiment, the second portion 30 may support at least in part the first portion 22, and the body 20 may substantially enclose the ground surface area underneath the body 20. Ground water which evaporates from the ground 2 that is enclosed by the first portion 22 and the second portion 30 may be trapped by the body 20 and forms as condensation on the hydrophobic surface 27. The condensation runs down the hydrophobic surface 27 on the underside of the body 20 to the reservoir or to the beneficiary of the passively collected water, such as the roots 6 of the plant 4 due to gravity. Trapping condensation in this fashion may reduce the amount of water lost through evaporation, which can be significant in semi-arid and arid climates.

According to an embodiment of the apparatus, the body 20 may comprise a generally radial shape that directs water flow, such as from dew, rainfall and condensation, to a reservoir or a beneficiary of the passively collected water, such as the roots 6 of a plant 4. According to an embodiment of the apparatus as shown in FIG. 2, the body 20 may be generally radial in shape and may be positioned around a reservoir or a beneficiary of the passively collected water, such as the roots 6 of a plant 4.

According to an embodiment, the body 20 may be also lightweight, strong, resilient to high temperatures and ultraviolet radiation, and waterproof. According to a further embodiment, the body 20 may be made from organic matter so as to be biodegradable and may also be configured to degrade after a particular duration has elapsed.

According to an embodiment, the body 20 may also comprise a plurality of ridges 50 which may be formed at approximately 10 to 80 degree angles at either side of each ridge 50. According to a further embodiment, the ridges 50 may be formed at approximately 20 to 40 degree angles at either side of the ridges 50. According to a yet further embodiment, the ridges 50 may be formed at approximately 30 degree angles at either side of the ridges 50, which is a slope which may be preferred for dew collection. The ridges 50 provide the body 20 with a greater surface area on which dew may form, which may increase water collection. The ridges 50 may also create shade which may reduce temperature increases of the body 20 caused by sunlight.

As wind may increase the water lost by the plant 4 through evaporation, according to an embodiment the body 20 may be shaped to reduce the moisture lost by the plant 4 to wind by at least partially shielding the plant 4 from wind. This retained moisture may keep the plant 4 cooler during the heat of the day and may therefore reduce the water lost by the plant 4 through transpiration to regulate the temperature of the plant 4.

According to an embodiment of the apparatus, the body 20 may be collapsible along ridges 50 which may facilitate compact storage and shipping of the apparatus, as well as may provide for the angle on either side of the ridges 50 to be adjustable. A collapsible body 20 may also provide for the body 20 to be deployed in partially radial shapes such as a half-circle.

A person skilled in the art will also appreciate that rain water collection, as well as dew and condensation collection, may increase by increasing the size of the water collection apparatus 10.

Figure 3:
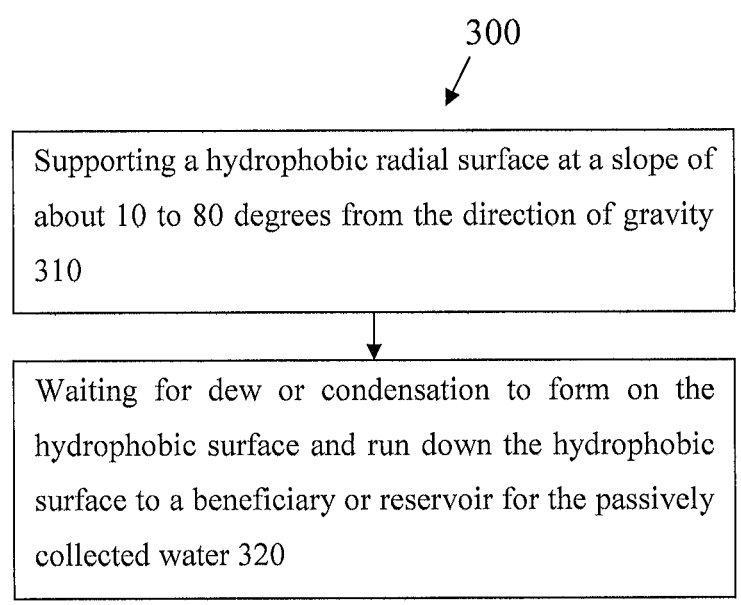
FIG. 3 is a flow diagram of a method for passively collecting water according to an embodiment of the present invention.

According to an embodiment of the method as shown in FIG. 3 and indicated generally by reference 300, water may be passively collected in an environment where dew forms by a step of supporting a hydrophobic radial surface at a slope of about 10 to 80 degrees from the direction of gravity 310 and a step of waiting for dew or condensation to form on the hydrophobic surface and run down the hydrophobic surface to a beneficiary or reservoir for the passively collected water 320. According to a further embodiment of the method, the slope may be about 50 to 70 degrees from the direction of gravity. According to a yet further embodiment of the method, the slope may be about 60 degrees from the direction of gravity. According to an embodiment, the method 300 may be carried out using a water collection apparatus such as the water collection apparatus 10, which may include a plurality of ridges 50 as described above. According to an embodiment, the beneficiary for the passively collected water may be a plant 4 which may comprise roots 6.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for passively collecting water in an environment where dew forms comprising:
   a body comprising a plurality of ridges and further comprising
      a hydrophobic surface at a slope of about 10 to 80 degrees from the direction of gravity; and
      a portion for supporting the hydrophobic surface at the slope;
      wherein the body is collapsible along the plurality of ridges and wherein the body, when the apparatus is positioned for use on a surface in the environment, substantially encloses the area of the surface in the environment underneath the body.

2. The apparatus of claim 1, wherein the slope is about 50 to 70 degrees from the direction of gravity.

3. The apparatus of claim 1, wherein the slope is about 60 degrees from the direction of gravity.

4. The apparatus of claim 1, wherein the body further comprises a second hydrophobic surface.

5. The apparatus of claim 1, wherein the body is annular in shape.

6. The apparatus of claim 1, wherein the body is partially radial in shape.

7. A method for passively collecting water in an environment where dew forms comprising:
   expanding a collapsed body of an apparatus for passively collecting water;
   positioning the body on a surface in the environment to substantially enclose the area of the surface in the environment underneath the body;
   supporting a hydrophobic radial surface on the body at a slope of about 10 to 80 degrees from the direction of gravity; and
   waiting for dew or condensation to form on the hydrophobic surface and run down the hydrophobic surface to a beneficiary or reservoir for the passively collected water.

8. The method of claim 7, wherein the body comprises a plurality of ridges.

9. The method of claim 7, wherein the slope is about 60 degrees from the direction of gravity.

10. The method of claim 7, wherein the beneficiary comprises a plant.

11. The method of claim 7, wherein the beneficiary comprises a plurality of plants.

\* \* \* \* \*